Figure 3:
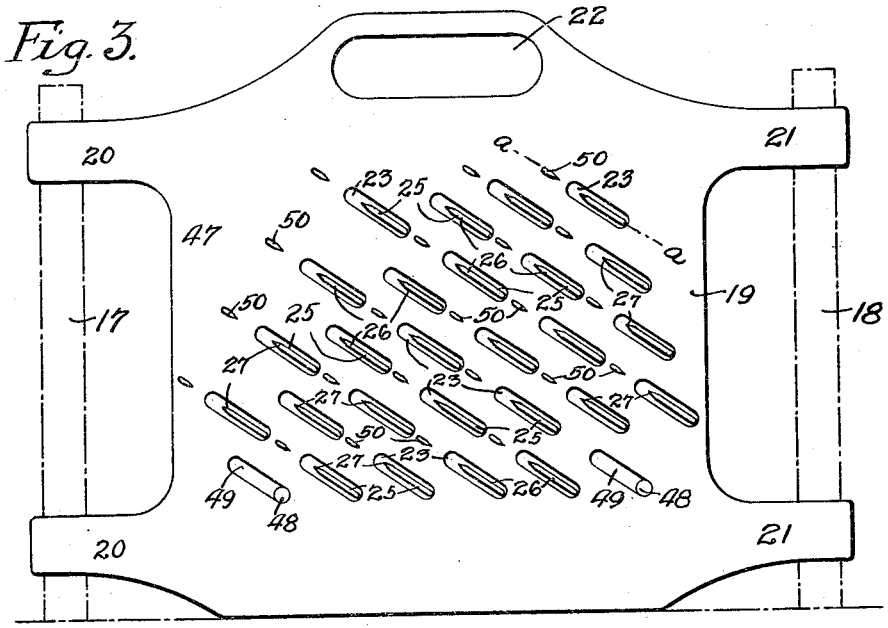

R. S. C. FOW & S. M. TEMPLETON.
SECURING APPARATUS FOR MEAT SLICING MACHINES.
APPLICATION FILED APR. 23, 1918.
1,272,934.
Patented July 16, 1918.
3 SHEETS—SHEET 1.
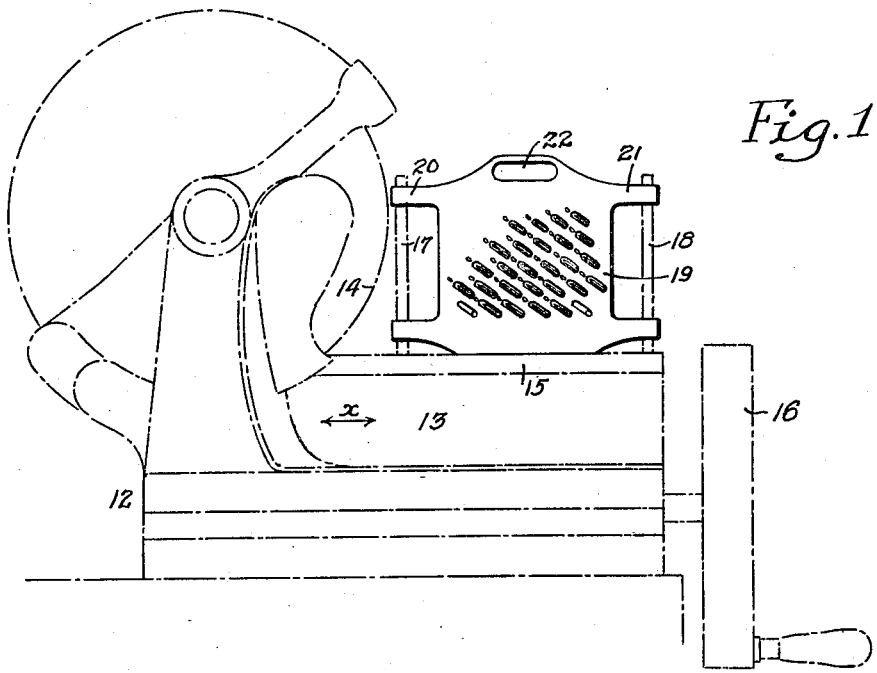
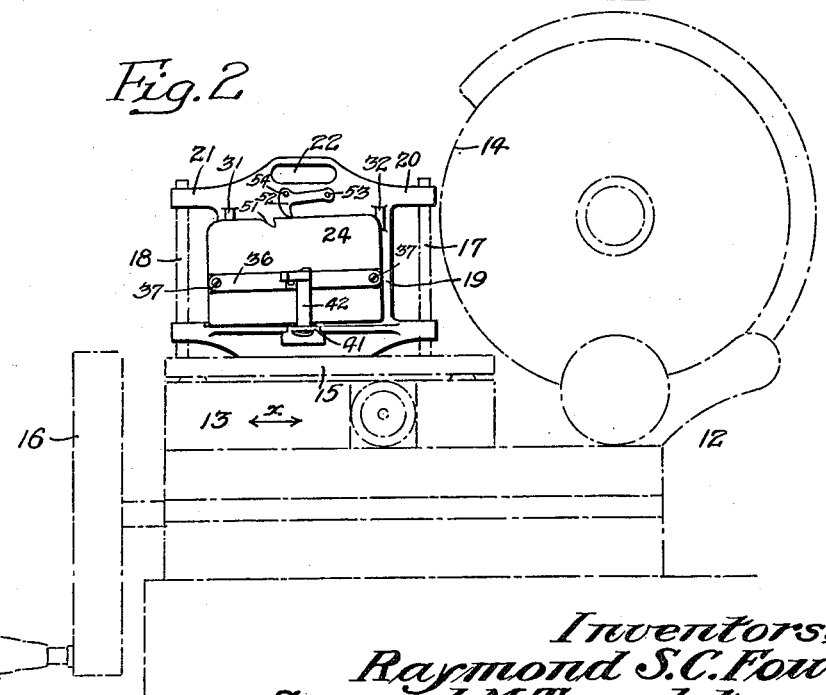

R. S. C. FOW & S. M. TEMPLETON.
SECURING APPARATUS FOR MEAT SLICING MACHINES.
APPLICATION FILED APR. 23, 1918.

1,272,934.

Patented July 16, 1918.
3 SHEETS—SHEET 2.

Witnesses,
Augustus B. Coppes
E. E. Reichart

Inventors,
Raymond S. C. Fow,
Samuel M. Templeton,
By Joshua R. H. Potts
their Attorney

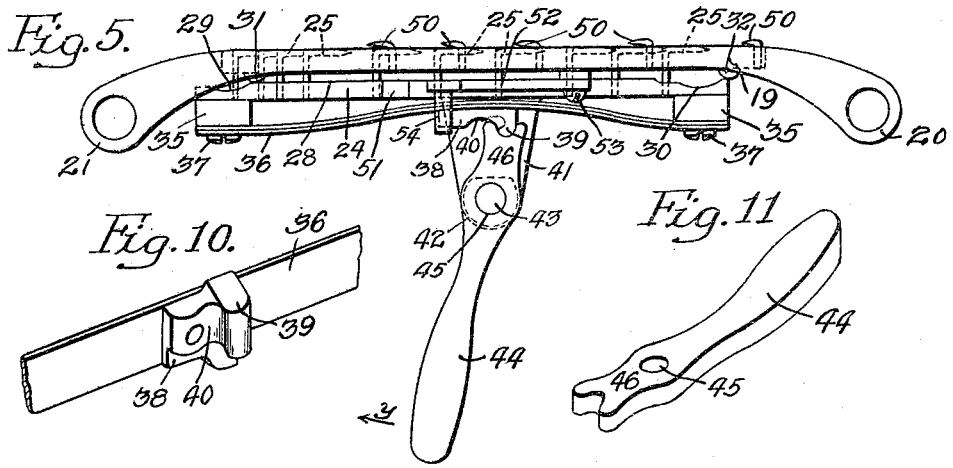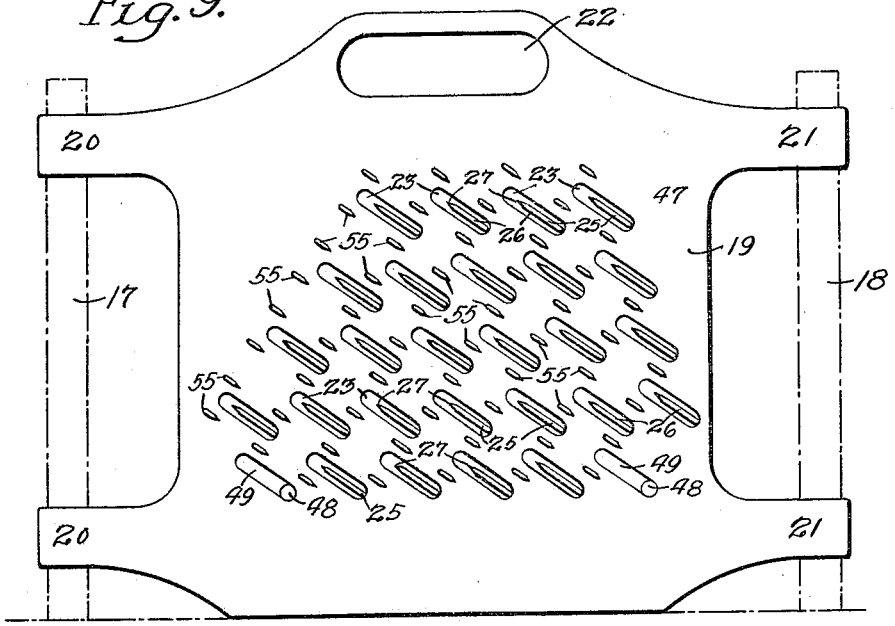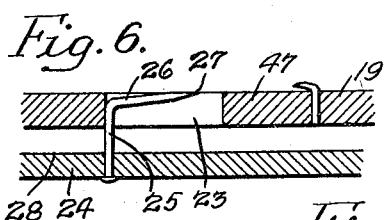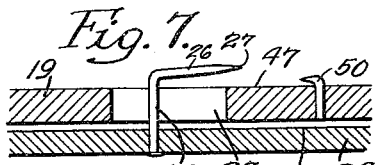

UNITED STATES PATENT OFFICE.

RAYMOND S. C. FOW AND SAMUEL M. TEMPLETON, OF PHILADELPHIA, PENNSYLVANIA; SAID FOW ASSIGNOR TO SAID TEMPLETON.

SECURING APPARATUS FOR MEAT-SLICING MACHINES.

1,272,934. Specification of Letters Patent. Patented July 16, 1918.

Application filed April 23, 1918. Serial No. 230,236.

*To all whom it may concern:*

Be it known that we, RAYMOND S. C. Fow and SAMUEL M. TEMPLETON, citizens of the United States, both residing at Philadelphia, county of Philadelphia, and State of Pennsylvania, have invented certain new and useful Improvements in Securing Apparatus for Meat-Slicing Machines, of which the following is a specification.

In slicing machines where meat, for example, is secured to a carriage which is moved toward and from a knife to cause said knife to intermittently cut slices from said meat, it has been found difficult to firmly secure the meat to the carriage when the end piece of meat becomes small. Numerous devices have been made for securing small end pieces of meat, commonly known as "last ends", but these devices, due to their construction, have been found to be impractical since they are complicated in construction and cannot be easily taken apart for cleansing purposes. Further than this, these devices, made prior to our invention, have been difficult to assemble and to take apart.

One object of our invention is to produce securing apparatus, for meat slicing machines or the like, which will be of extremely simple construction and which will be efficiently operative to grasp and firmly hold the "last ends" or small pieces of meat so that practically all of the meat can be sliced without waste.

Another object is to so construct our invention that it can be quickly and easily operated with one hand and by a single movement of a handle to firmly secure and support an end of meat or the like so that it can be sliced with practically no waste.

A further object is to so design the apparatus of our invention that it can be quickly assembled or taken apart without the use of tools.

A still further object is to provide our improved apparatus with means whereby the relative advancing movement between the meat and the knife will tend to more firmly secure the meat to its supporting means, and the relative separating movement between the knife and the meat will not effect the loosening of the meat from its support.

These objects, and other advantageous ends which will be described hereinafter, we attain in the following manner, reference being had to the accompanying drawings in which—

Figure 4:
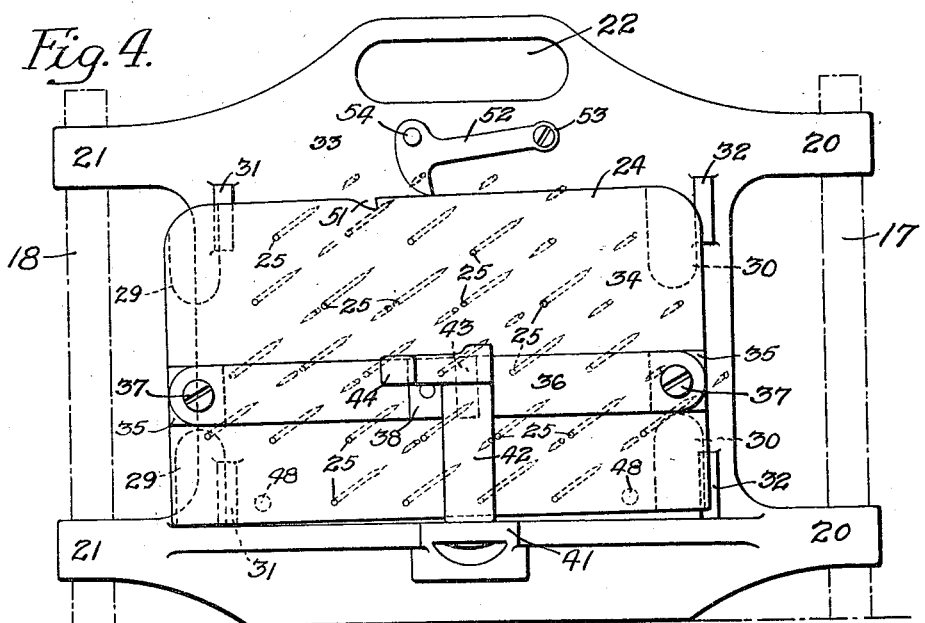

Figure 1 is a front elevation showing the apparatus of our invention attached to a meat slicing machine, Fig. 2 is a rear view of Fig. 1, Fig. 3 is an enlarged front face view of the apparatus of our invention, Fig. 4 is a rear view of the apparatus shown in Fig. 3, Fig. 5 is a top plan view of Fig. 4, Figs. 6, 7, and 8 are fragmentary sectional views taken on the line *a—a* of Fig. 3, illustrating various relative positions of certain of the elements of our invention, Fig. 9 is a view of similar nature to Fig. 3, showing a slightly modified form of our invention, Fig. 10 is a fragmentary perspective view of certain of the features of our invention, and Fig. 11 is a perspective view of a handle which forms a part of our invention.

Referring to the drawings, 12 represents a meat slicing machine having a main carriage 13 which is reciprocable in the directions, indicated by the double arrow *x* in Figs. 1 and 2, toward and from a rotatable circular knife 14. A secondary carriage 15 is mounted upon the main carriage 13 and is moved in a direction transversely to the movement of the carriage 13 so as to advance the meat periodically a distance equal to the slice of the meat to be cut, the meat being secured by the apparatus of our invention in a manner hereinafter described.

The movements of the carriages 13 and 15 and the rotation of the knife is accomplished by mechanism (not illustrated) through the medium of the rotation of a hand operated wheel 16. However, the elements so far disclosed do not by themselves form a part of our invention since they may be varied and may be of any of the types in use prior to our invention.

The secondary carriage 15 has two posts 17 and 18. These posts are fixed with relation to the secondary carriage. An abutment member illustrated in the form of a plate 19, has side lugs 20 and 21 which are bored to fit over the posts 17 and 18, respectively, so that the bottom of the plate 19 rests upon the secondary carriage 15. The upper portion of the plate 19 has an elongated slot 22 whereby the hand can be readily inserted therethrough so as to lift the plate from the posts 17 and 18 or slip it thereover.

This abutment plate 19 has a plurality of elongated slots 23 cut therein and these slots are arranged at a slant or incline, as clearly shown in Figs. 1 and 3. A plate 24 is located to the rear of the abutment plate 19 and secured to this plate are a number of pins 25 which have hooked portions 26 which are pointed at their extreme outer ends as shown at 27. These hooked portions 26 of the pins 25 extend at an angle or incline which is substantially similar to the angle or incline of the slots 23 and are adapted to be projected through respective slots 23 in the bottom plate 19 in a manner hereinafter more clearly described.

The inner surface 28 of the plate 24 is provided with recesses 29 and 30 adjacent opposite ends of the plate, and these recesses together with adjacent portions of the surface 28 form cams which coact with lugs 31 and 32 on the rear surface 33 of the abutment plate 19. The rear surface 34 of the plate 24 has rearwardly projecting blocks 35 which are located adjacent opposite ends, and a plate spring 36 has its opposite ends respectively secured to the blocks 35, such for example as by screws 37. Thus the plate spring 36 is suspended between the blocks 35 and is spaced to the rear of the rear surface 34 of the plate 24.

A shoe block 38 is secured to the rear surface of the plate spring 36 and has a rearwardly curved finger 39 which blends with an inwardly curved surface 40.

The abutment plate 19 has a rearwardly projecting arm 41 upon which is mounted a standard 42 having a pivot pin 43 of smaller diameter projecting upwardly from its top. A handle 44 has a hole 45 which freely fits the pivot pin 43 so that to remove the handle from the pivot pin, it is merely necessary to raise the handle and it will become free from said pin. The handle 44 has a bifurcated end 46, the bifurcations of which are adapted to embrace the curved finger 39, as clearly shown in Fig. 5.

The lugs 31 and 32 on the rear surface 33 of the abutment plate 19 normally engage the inner surface 28 of the plate adjacent the recesses 29 and 30 so that the plate 24 is spaced to its fullest extent from the abutment plate 19. When in this position the plate spring 36 is bowed and thereby under tension so that the plate 24 is held against the lugs 31 and 32 with a pressure supplied by the tension of the spring 36. Furthermore, the pointed ends of the pins 25 as shown clearly in Figs. 5 and 6 are substantially flush with the outer surface 47 of the abutment plate 19.

The plate 24 has stud pins 48 which project into slots 49 in the abutment plate 19 (see particularly Figs. 3 and 4). These slots 49 extend at a slant or incline substantially equal to the slots 23 above described, and the stud pins 48 are of a diameter substantially similar to the width of the slots 49. It will thus be understood that by moving the handle in the direction of the arrow $y$ in Fig. 5, the plate 24 will be moved toward one side and the deepest portions of the recesses 29 and 30 will become in register with the lugs 31 and 32. During this latter mentioned movement the spring 36, due to the pressure of the handle end 46 upon it, will keep the plate 24 in frictional engagement with the lugs 31 and 32. In other words, the spring 36 when pressed by the handle end 46, has a tendency to move the plate 24 toward the abutment plate 19. However, the position of the lugs 31 and 32 relatively to the recesses 29 and 30 actually determines the space between the plates 24 and 19.

The hooked portions 26 of the pins 25, when the lugs 31 and 32 are in engagement with the deepest portion of the recesses 29 and 30, will be projected through the several slots 23, as shown in Fig. 7. Also, during said sidewise movement of the plate 24 it will be elevated in the direction of the slots 23 and 49 due to the fact that the stud pins 48 will be confined to the path of movement prescribed by the slots 49. The abutment plate 19 is provided with pointed spuds 50, the spuds being in alinement with the respective slots as shown in Figs. 1 to 8, inclusive, and the points of the spuds 50 extend in a direction opposite to the points of the pins 25.

A continued movement of the handle 44 in the direction of the arrow $y$ in Fig. 5 will cause the inner surface 28 of the plate 24 to again ride up upon or engage the lugs 31 and 32. The recesses 29 and 30 are curved in cross section so that the movement of the plate 24 toward the plate 19 will be done gradually and easily. During the last mentioned movement of the plate 24 due to the actuation of the handle 44 and the engagement of the lugs 31 and 32 with the opposite sides of the recesses 29 and 30, the hooked portions of the pins 25 will be projected over the surface 47 of the abutment plate 19 and will also be moved toward said surface 27 and toward the spuds 50.

The result of this latter mentioned movement will bring the pins into the position relatively to the plate 19 and the spuds 50, as clearly shown in Fig. 8.

It will be noted that the curved finger 39 on the shoe block 38 is of such height that it will permit the raising and lowering of the plate 24 without becoming disengaged from the bifurcated portion 46 of the handle 44 so that there is a free sliding movement between the shoe block 38 and the handle 44.

It will be thus understood that if a piece of meat is pressed against the surface 47 of the abutment plate 19 when the pins 25 are in the positions illustrated in Figs. 1 to 6, inclusive, and the handle 44 is moved in the direction of the arrow $y$ to its fullest extent, that the hooked portion of said pins 25 will be first moved outwardly and upwardly at an angle to penetrate the meat, then inwardly from the position shown in Fig. 7 to the position shown in Fig. 8. The pointed spuds 50 will hold the meat against relative sliding movement with the plate 19 and the meat will be firmly secured to the abutment plate 19. The top edge of the plate 24 is provided with a notch 51 and a pawl 52 is pivoted at 53 to the plate 19. The notch 51 is so located that when the plate has been moved to bring the pins into the position shown in Fig. 8, the pawl 52 will drop in said notch and lock the plate against accidental rearward movement, at the same time the spring 36 will be acting to firmly hold the plate 24 against the lugs 31 and 32 of the plate 19. When in this position the machine can be operated to move the meat toward and from the knife. The pointed spuds 50 also serve to prevent the tendency of the knife to draw the meat off the hooked portions of the pins 25 when the meat is being moved away from the knife after the cut has been made.

The pawl 52 is provided with a rearwardly projecting bar 54 so that when it is desired to release the meat from the abutment plate 19, the handle 44 can be grasped and at the same time the thumb of the hand can be elevated to strike the bar 54 and lift the pawl out of the notch 51. The handle 44 can then be moved into the direction opposite to that of the arrow $y$ and the reverse action of the pins 25 will be attained to release the meat from its mounting.

In the form of our invention shown in Fig. 9, we have illustrated the spuds at 55 and have used a different disposition of these spuds than illustrated in the other forms of our invention, and it will be noted that in Fig. 9 these spuds 55, while pointing in a direction opposite from the points of the pins, they are located at either side of the paths of movement of the pins 25. In all other respects the construction of Fig. 9 is similar to that described in connection with the other figures of drawing, and we have therefore given similar parts corresponding reference numerals.

To completely separate the plate 24 from the abutment plate 19, it is merely necessary to move the handle 44 into such position that the lugs 31 and 32 will be within the recesses 29 and 30. In this position the plate spring 30 is under comparatively little tension and the handle 44 can be bodily lifted from the pivot pin 43. This action will entirely release the tension of the spring 36 and the plate 24 can be bodily moved rearwardly to draw the pins 25 out of the slots 23 and the apparatus will become separated into three parts, namely, the handle 44, the plate 24 with its pins and spring, and the plate 19. When thus separated, each of these parts can be quickly and easily cleaned or repaired and can be quickly assembled as is obvious from the foregoing description. It will thus be understood that the parts of our improved apparatus can be quickly assembled and taken apart without the use of tools and, therefore, the parts can be quickly and easily cleaned. This is an extremely important and valuable feature of our improved apparatus since in devices of this nature if it is difficult or requires a long time to separate the elements, they are very often permitted to become very dirty and unsanitary.

By having the slots 23 and the hooked portions of the pins 25 extending at an incline, the pins 25 are capable of resisting the cutting action or thrust of the knife upon the meat since they point directly to the upper and initially contacting edge portion of the knife, as clearly shown in Fig. 1. It will be further noted that a single movement of the hand lever or handle 44 in one direction effects a number of movements to the pins 25. In the first place, the pins are moved upwardly at an incline; second, they are moved outwardly during their upward inclined movement to penetrate the meat; and finally they move inwardly toward the abutment plate, thus clamping the meat firmly thereto.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:

1. Apparatus of the character described including an abutment plate; pins having pointed hooked portions; means for moving the hooked portions of said pins to a predetermined extent beyond the outer surface of said plate and so that said hooked portions move in the direction of their lengths to pierce material held against said plate; and means then operative to retract said pins to clamp said material to the abutment plate, substantially as described.

2. Apparatus of the character described including an abutment plate having slots therein; pins adapted to be projected through said slots and having pointed hooked portions; means for moving the hooked portions of said pins to a predetermined extent beyond the outer surface of said plate and so that said hooked portions move in the direction of their lengths at an incline to pierce material pressed against said plate; and means operative after said latter movement to retract said hooked portions of the pins to clamp material to the abutment plate, substantially as described.

3. Apparatus of the character described including an abutment plate having slots therein; actuating means located to the rear of said abutment plate; and a second plate positioned between said actuating means and the abutment plate and having pins freely movable through said slots when the second mentioned plate is operatively moved, said second plate being operatively connected with said actuating means with a sliding connection whereby the second plate and the actuating means can be slidably disconnected to permit the ready removal of said second plate, substantially as described.

4. Apparatus of the character described including an abutment plate having slots therein; a second plate having pins adapted to be projected through the slots; and a pivotally mounted handle adapted to move and hold said second plate with the pins projecting through said slots, the removal of said handle from its pivot permitting said second plate to be bodily removed to withdraw said pins from the slots, substantially as described.

5. Apparatus of the character described including an abutment plate having slots therein; a second plate having pins thereon, said pins having hooked portions movable through said slots; a spring on said second plate; and means operative through the medium of the resiliency of said spring for moving said second plate to move said pins through said slots to a position beyond the outer surface of said first plate and to move said hooked portions of the pins in the direction of their lengths, substantially as described.

6. Apparatus of the character described including an abutment plate having slots therein; a second plate having pins thereon, said pins having hooked portions movable through said slots; a spring on said second plate; a shoe on said spring; and a lever for actuating said shoe whereby said second plate is pushed toward said first plate to cause the hooked portions of the pins to be projected through said slots and the second plate is moved sidewise to move said hooked portions of the pins in said latter direction of movement of said second plate, substantially as described.

7. Apparatus of the character described including an abutment plate having slots therein; a second plate having pins thereon, said pins having hooked portions movable through said slots, said second plate having recesses therein, said first plate having lugs thereon adapted to register with said recesses; a spring on said second plate; a shoe on said spring; and a lever having a portion for actuating said shoe whereby a movement of said lever will place the spring under tension and slide said second plate to alternately cause said lugs to engage said recesses to permit the pins to be projected through said slots and to engage portions of said plate adjacent the recesses to cause the pins to be retracted, substantially as described.

8. Apparatus of the character described including an abutment plate having slots therein; a second plate having pins thereon, said pins having hooked portions movable through said slots, said second plate having recesses therein, said first plate having lugs thereon adapted to register with said recesses; a spring on said second plate; a shoe on said spring; a lever having a portion for actuating said shoe whereby a movement of said lever will place the spring under tension and slide said second plate to alternately cause said lugs to engage said recesses to permit the pins to be projected through said slots and to engage portions of said plate adjacent the recesses to cause the pins to be retracted; and coöperative means between said two plates whereby said movement of the second plate moves said pins in an inclined direction, substantially as described.

9. Apparatus of the character described including an abutment plate having slots therein; a second plate having pins thereon, said pins having hooked portions movable through said slots, said second plate having recesses therein, said first plate having lugs thereon adapted to register with said recesses; a spring on said second plate; a shoe on said spring; a lever having a portion for actuating said shoe whereby a movement of said lever will place the spring under tension and slide said second plate to alternately cause said lugs to engage said recesses to permit the pins to be projected through said slots and to engage portions of said plate adjacent the recesses to cause the pins to be retracted; and means for locking said second mentioned plate when the pins are in their retracted position, substantially as described.

10. Apparatus of the character described including an abutment plate having inclined slots therein; a second plate having pins thereon, said pins having hooked portions movable through said slots, said second plate having recesses therein, said first plate having lugs thereon adapted to register with said recesses; a spring on said second plate; a shoe on said spring; a pivoted lever having a portion slidably embracing said shoe whereby a movement of said lever will place the spring under tension and slide said second plate to alternately cause said lugs to engage said recesses to permit the pins to be projected through said slots and to engage portions of said plate adjacent the recesses to cause the pins to be retracted; and coöperative means between said two plates whereby said movement of the second plate moves said pins in an inclined direction, substantially as described.

In testimony whereof we have signed our names to this specification in the presence of two subscribing witnesses.

RAYMOND S. C. FOW.
SAMUEL M. TEMPLETON.

Witnesses:
MARY A. INGLAR,
CHAS. E. POTTS.

Copies of this patent may be obtained for five cents each, by addressing the "Commissioner of Patents, Washington, D. C."